(12) United States Patent
Braley et al.

(10) Patent No.: US 8,016,543 B2
(45) Date of Patent: Sep. 13, 2011

(54) COMPOSITE CASE ARMOR FOR JET ENGINE FAN CASE CONTAINMENT

(76) Inventors: Michael Scott Braley, Cincinnati, OH (US); James D. Dorer, Brighton, MI (US); Gary D. Roberts, Wadsworth, OH (US)

( * ) Notice: Subject to any disclaimer, the term of this patent is extended or adjusted under 35 U.S.C. 154(b) by 964 days.

(21) Appl. No.: 11/695,435

(22) Filed: Apr. 2, 2007

(65) Prior Publication Data

US 2009/0067979 A1  Mar. 12, 2009

(51) Int. Cl.
*F01B 25/16* (2006.01)
(52) U.S. Cl. .............. 415/9; 415/173.4; 415/174.4
(58) Field of Classification Search .............. 415/9, 108, 415/170.1, 173.1, 173.4, 173.6, 174.4, 196, 415/197, 200, 215.1
See application file for complete search history.

(56) References Cited

U.S. PATENT DOCUMENTS

| | | | | |
|---|---|---|---|---|
| 4,934,899 A | * | 6/1990 | Patacca | 415/9 |
| 4,940,386 A | | 7/1990 | Feuvrier et al. | |
| 5,160,248 A | * | 11/1992 | Clarke | 415/9 |
| 5,161,947 A | | 11/1992 | Eckfeldt et al. | |
| 5,344,280 A | * | 9/1994 | Langenbrunner et al. | 415/9 |
| 5,403,148 A | * | 4/1995 | Forrester | 415/9 |
| 5,447,411 A | * | 9/1995 | Curley et al. | 415/9 |
| 5,482,429 A | * | 1/1996 | Penda | 415/9 |
| 5,516,257 A | * | 5/1996 | Kasprow et al. | 415/9 |
| 6,053,696 A | * | 4/2000 | Roberts | 415/9 |
| 6,059,524 A | * | 5/2000 | Costa et al. | 415/9 |
| 6,113,347 A | * | 9/2000 | Forrester | 415/9 |
| 6,149,380 A | | 11/2000 | Kuzniar et al. | |
| 6,227,794 B1 | | 5/2001 | Wojtyczka et al. | |
| 6,290,455 B1 | * | 9/2001 | Hemmelgarn et al. | 415/9 |
| 6,364,603 B1 | | 4/2002 | Czachor et al. | |
| 6,637,186 B1 | | 10/2003 | Van Duyn | |
| 6,652,222 B1 | * | 11/2003 | Wojtyczka et al. | 415/9 |
| 6,699,109 B1 | | 3/2004 | Fox et al. | |
| 6,814,541 B2 | * | 11/2004 | Evans et al. | 415/200 |
| 6,979,172 B1 | * | 12/2005 | Mackenzie | 415/9 |
| 7,008,173 B2 | * | 3/2006 | Gabrys et al. | 415/9 |
| 7,390,161 B2 | * | 6/2008 | Xie et al. | 415/9 |
| 7,517,184 B2 | * | 4/2009 | Costa et al. | 415/1 |
| 7,604,199 B2 | * | 10/2009 | McMillan et al. | 244/53 R |
| 2004/0146393 A1 | * | 7/2004 | Evans et al. | 415/9 |
| 2005/0089398 A1 | * | 4/2005 | Jutras | 415/139 |
| 2006/0201135 A1 | * | 9/2006 | Xie et al. | 60/226.1 |
| 2007/0081887 A1 | | 4/2007 | Xie et al. | |

\* cited by examiner

*Primary Examiner* — Edward Look
*Assistant Examiner* — Aaron R Eastman
(74) *Attorney, Agent, or Firm* — Hahn Loeser & Parks LLP

(57) ABSTRACT

A gas turbine fan blade containment assembly includes a fan case having an inner surface surrounding a jet engine fan and an outer surface. Mounted on the inner surface and across a blade containing region of the fan case is a load spreader layer for initially receiving a point load from a fan blade release (a "blade-out event"). A band layer is mounted to an outer surface of the fan case for carrying at least a portion of a hoop tensile load on the fan case resulting from the blade-out event, and separator film layer is mounted between the outer surface of the fan case and the band layer to retard the formation of stress concentrations in the band layer. In one embodiment, the load spreader layer includes a plurality of circumferentially-arrayed load spreader layer segments.

20 Claims, 7 Drawing Sheets

COMPOSITE CASE ARMOR FOR JET ENGINE FAN CASE CONTAINMENT

GOVERNMENT INTEREST

The U.S. Government has a paid-up license in this invention and the right in limited circumstances to require the patent owner to license others on reasonable terms as provided for by the terms Contract No. NAS 3 02160, awarded to A&P Technology, Inc. by the National Aeronautics and Space Administration.

FIELD OF THE INVENTION

This invention relates to gas turbine jet engines, and more particularly, to fan case systems for containment of gas turbine jet engines during a blade-out event.

BACKGROUND OF THE INVENTION

Figure 1:
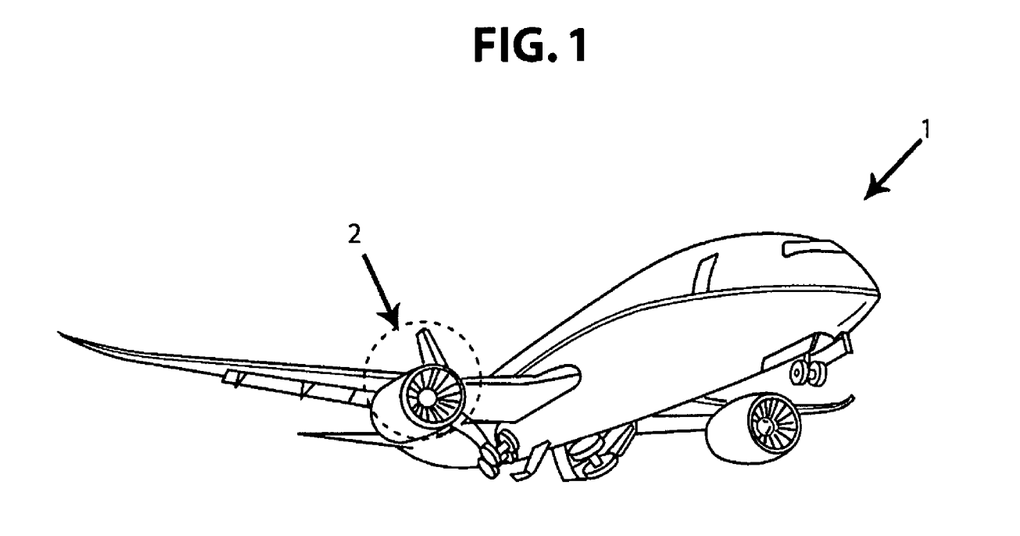
FIG. 1 is a perspective view of a conventional jet airliner having jet engines.
Figure 2:
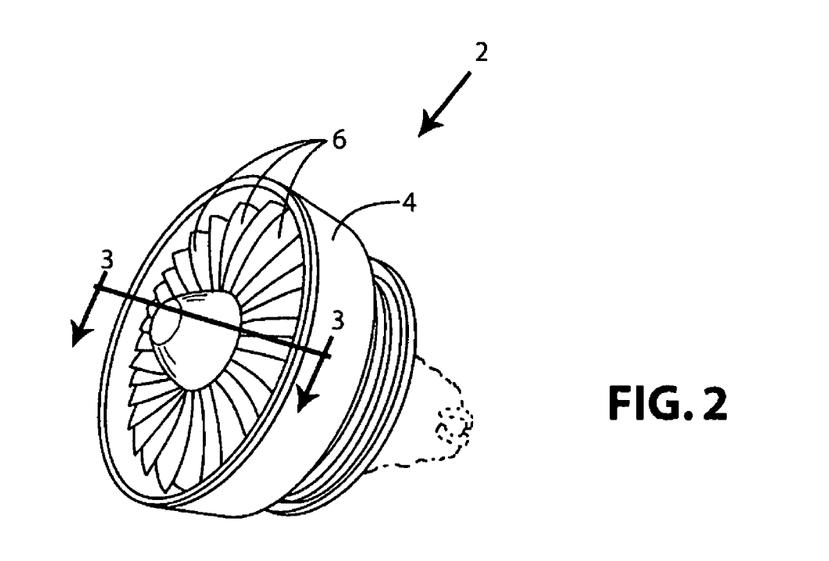
FIG. 2 provides a cut-away view of one of the jet engines illustrated in FIG. 1.

FIG. 1 provides a perspective view of a conventional commercial airliner 1 having gas turbine jet engines 2. FIG. 2 presents an enlarged view of a cut-away section of the jet engine 2 of FIG. 1, including a fan containment case 4 that surrounds rotary blades 6 of the jet engine 2.

In rare instances, one or more of the blades 6 in the jet engine 2 may be caused to release, for example, as a result of the ingestion of a foreign object. In such an event, the released fan blade must be contained so as not to penetrate the fan case 4. In addition, the fan case 4 must retain its structural integrity while the jet engine 2 shuts down in order to prevent further potentially catastrophic damage. Under these circumstances, a high strength fan containment case becomes critically necessary.

Figure 3:
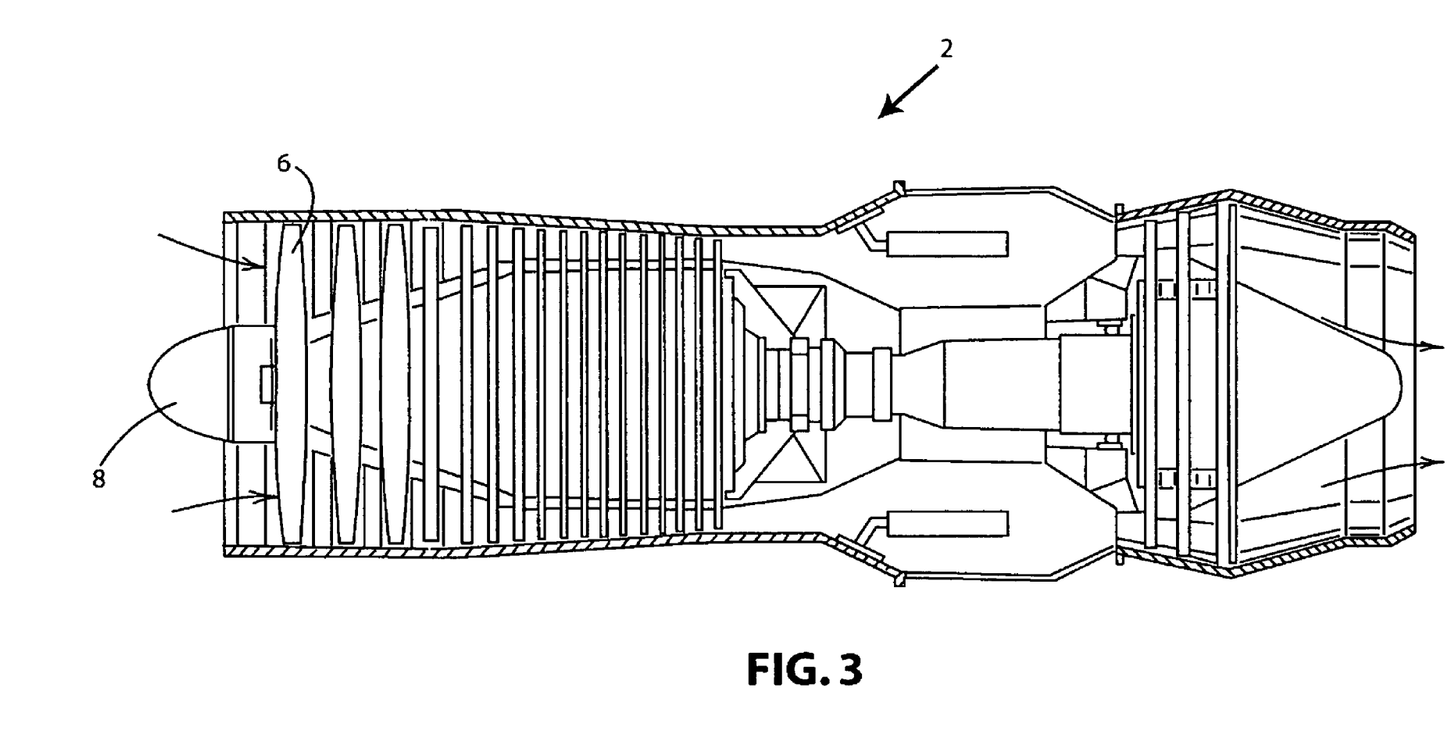
FIG. 3 provides a sectional view of the jet engine illustrated in FIG. 2.
Figure 4:
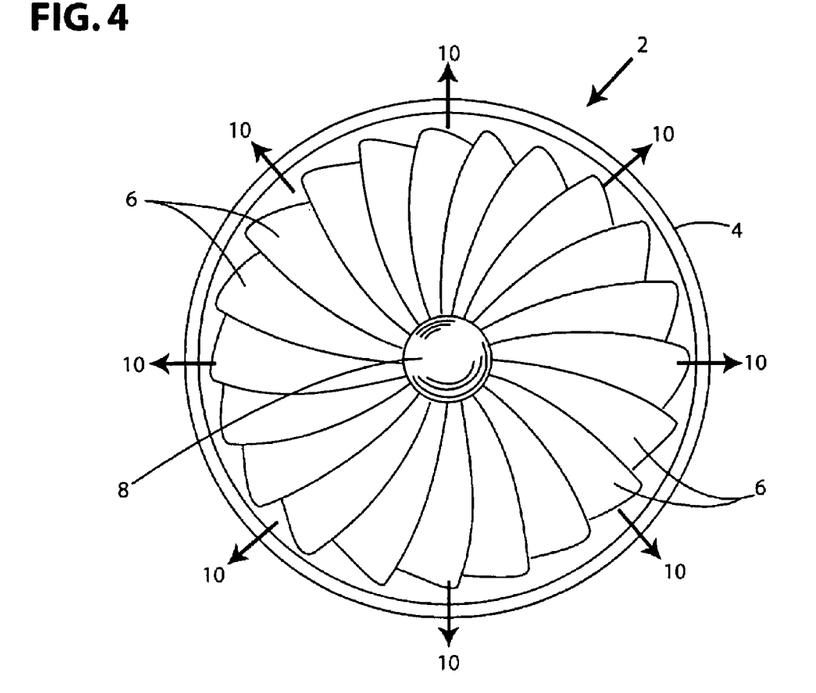
FIG. 4 provides a front view of the jet engine illustrated in FIG. 2.

The mechanisms of fan blade release are further illustrated with reference to FIGS. 3-5. FIG. 3 presents a cut-away sectional view of the fan containment case 4 along the lines 3-3 of FIG. 2. Blades 6 are shown at the intake side of the case 4. FIG. 4 presents a front view of the fan containment case 4 looking aft down a longitudinal axis defined by fan hub 8 of the engine 2 at which the blades 6 are secured.

During normal operation of the jet engine 2, the blades 6 rotate around the fan hub 8. Due to the engine rotation, centrifugal forces are generated on each blade 6 that is supported by the fan hub 8. During a blade-out event, blade 6a (as shown in FIG. 5) disengages from the fan hub 8 to become a pointed projectile which can impact the interior of the fan case 4 and cause the generation of a point load at the location of impact. As illustrated in FIG. 5, with the dislodging of blade 6a, a hoop tensile load is generated at the area of impact of the blade 6a. The resulting point load at the interior of the fan case 4 also results in a distortion in the symmetry of fan case 4, as shown by the displacement 13 in the case 4 of FIG. 5.

Two approaches for containing a released fan blade within the fan case 4 have been successfully used previously. In a first approach (the "softwall" fan case), a metal casing is over-wound with dry aramid fibers. A broken blade is allowed to pierce and pass through the metal layer, where it is stopped and contained within the external aramid wrap. In the second approach (the "hardwall" fan case), a single metal hardwall casing is designed to reflect the broken blade back into the engine. The hardwall approach enables designers to improve engine aerodynamics by building a fan case with a smaller radial envelope, since there is no "dead space" required for absorbing the broken blade. However, hard wall fan cases tend to be comparatively heavy, and still maintain some risk that the blade may pass completely through the fan case.

Accordingly, it would be desirable to overcome the drawbacks of prior art methods used for containing fan blades in jet engines during "blade-out" events.

SUMMARY OF THE INVENTION

In the present invention, a fan blade containment assembly for a gas turbine engine includes a fan case having an inner surface for surrounding a jet engine fan mounted for rotation about an engine axis and an outer surface. Mounted on the inner surface and across a circumferentially and axially extending blade containing region of the fan case are one or more load spreader layers. In the event that one or more of the fan blades releases (a "blade-out event"), each load spreader layer acts as a point load spreader to isolate and distribute a point load generated on the load spreader layer by a released fan blade to the fan case. In addition, the load spreader layer acts to mitigate cutting and/or gouging of the inner surface of the fan case that may otherwise be caused by sharp features on the released fan blade. Each load spreader layer may be made from a wide variety of suitable materials including, for example, fiber-reinforced polymers, non-reinforced polymers, ceramics and metals.

The fan blade containment assembly may further include one or more band layers mounted to an outer surface of the fan case and extending across the blade containing region. Each band layer is capable of carrying at least a portion of a hoop tensile load on the fan case that results from a blade-out event, thereby enabling the strength, cost and thickness of individual load spreader segments to be further reduced. The band layers may be made from a wide variety of suitable materials including, for example, fiber-reinforced polymers, carbon braid, cloth fiber or triaxial braid including carbon fibers, quartz fibers or glass fibers.

The fan blade containment assembly including one or more band layers may further include a separator film layer mounted between the outer surface of the fan case and the band layers. The separator film layer acts to retard the formation of stress concentrations in the band layer as a result of the blade-out event and may be made, for example, from a fluoropolymer such as polytetrafluoroethylene (PTFE).

In one embodiment of the present invention, the load spreader layer is configured within the blade-containing region as a plurality of circumferentially-arrayed load spreader layer segments, the plurality of segments defining a plurality of gaps between ends of adjacent ones of the plurality of load spreader segments. In another embodiment, the load spreader layer is configured as a single, circumferentially-continuous structure rather than as a plurality of circumferentially-arrayed segments.

In embodiments of the present invention having more than one load spreader layer or more than one band layer, the individual layers may be formed from different materials to meet particular performance requirements. For example, in an embodiment having first and second load spreader layers, the first load spreader layer may be formed from a polymer or polycarbonate material, and the second load spreader segments may be formed from a steel or ceramic material. In a fan blade containment assembly having at least two layers of load spreader segments, the segment layers may be positioned so that ends of segments in one layer lie along the arcuate lengths of segments in another layer.

BRIEF DESCRIPTION OF THE DRAWINGS

The invention will become more readily apparent from the Detailed Description of the Invention, which proceeds with reference to the drawings, in which:

FIG. 7b provides a sectional view of the container layer segment of FIG. 7a;

In the drawings, like reference numerals designate corresponding parts throughout the several depicted views.

DETAILED DESCRIPTION OF THE INVENTION

Figure 6A:
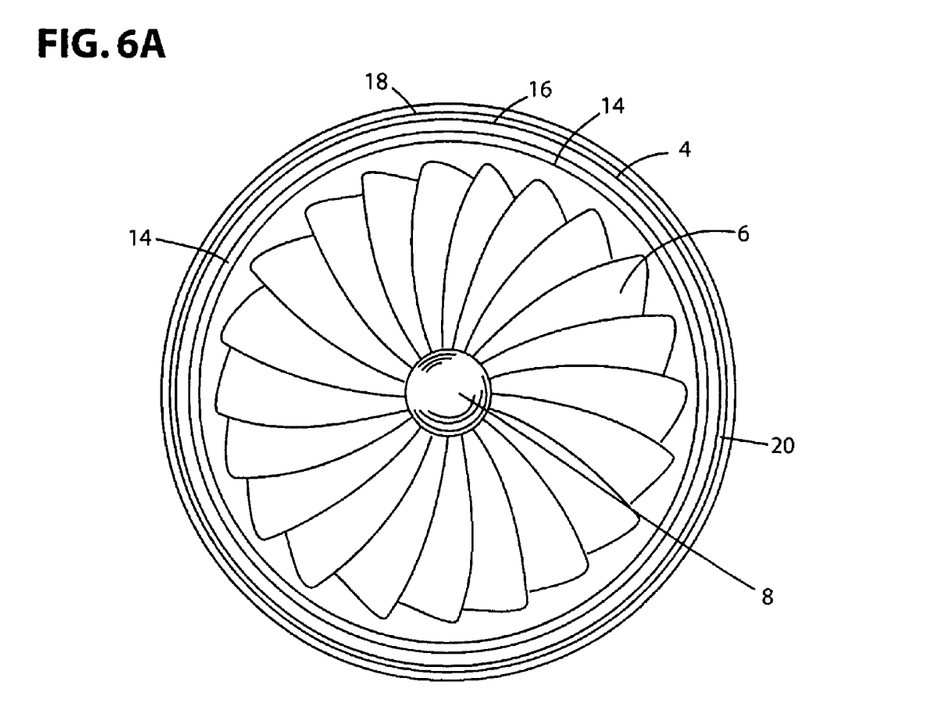
FIG. 6a provides a front view of the jet engine illustrated in FIG. 2 that has been adapted according to principles of the present invention.

Referring now to FIG. 6a, there is shown an exemplary portion of a fan containment case 4 according to principles of the present invention. The fan case 4 includes three generally concentric layers 14, 16 and 18 that effectively and efficiently reinforce the fan case 4 to accommodate loads resulting from blade-out events.

The first layer 14 comprises a load spreader layer. The load spreader layer 14 operates to distribute a point load generated by the liberated pointed projectile blade 6a of FIG. 5 as it strikes the load spreader layer 14 into the second layer 16. In addition, the load spreader layer acts to mitigate cutting and/or gouging of an inner surface of the second layer 16 that may otherwise be caused by sharp features on the released blade.

By distributing the point load into the second layer 16 and mitigating cutting and or gouging of the second layer 16 at the impact location, the stress concentration in the second layer 16 may be diminished at the impact location, thus enabling the second layer 16 to more easily carry the impact load of a projectile blade 6a. First layer 14 can be produced from a variety of materials including conventional fiber reinforced or non-reinforced polymers, ceramic or metals (for example, stainless steel and other ductile metals with high impact strength), as permitted according to cost and weight requirements.

The second layer 16 defines a casing portion of the fan casing 4, which may be produced, for example, from a conventional fiber reinforced polymer (FRP). The third or band layer 18 defines a band surrounding the fan casing portion 16, and may also be produced from a FRP. The third layer 18 encapsulates the first and second layers 14 and 16, and is selected to have strength and stiffness properties in accordance with the energy absorbing needs of the containment system.

Alternatively, one or more of layers 16 and 18 may be produced from a FRP braided material. A single selected braid material can be used in each of layers 16, 18, or different types of braid may be used in each layer. In addition, a fiber reinforcement, including braid and other types of reinforcement such as cloth fiber, can be symmetrically distributed for example in all directions on the layers 16 and 18, around the circumference of the fan case 4, along a longitudinal axis backward from the hub 8, or asymmetrically distributed along the same or other directions. A suitable reinforced braid may include carbon fiber, quartz fiber or glass fiber, in an equiaxed braid having fibers arranged in at least three different fiber directions (for example, 0 degrees and +/−60 degrees).

In addition, a fourth or separator film layer 20 may be applied as film separating the second and third layers, and can be produced, for example, from a fluoropolymer such as PTFE. Separator film layer 20 may act for example to discourage the formation of stress concentrations in the third layer 18 at an impact location. As in the case of layers 16 and 18, specifications for separator film layer 20 will vary in accordance with the specifications of the fan case 4, as dictated for example by particular performance, weight and cost requirements, and therefore do not limit the scope of the present invention.

Figure 6B:
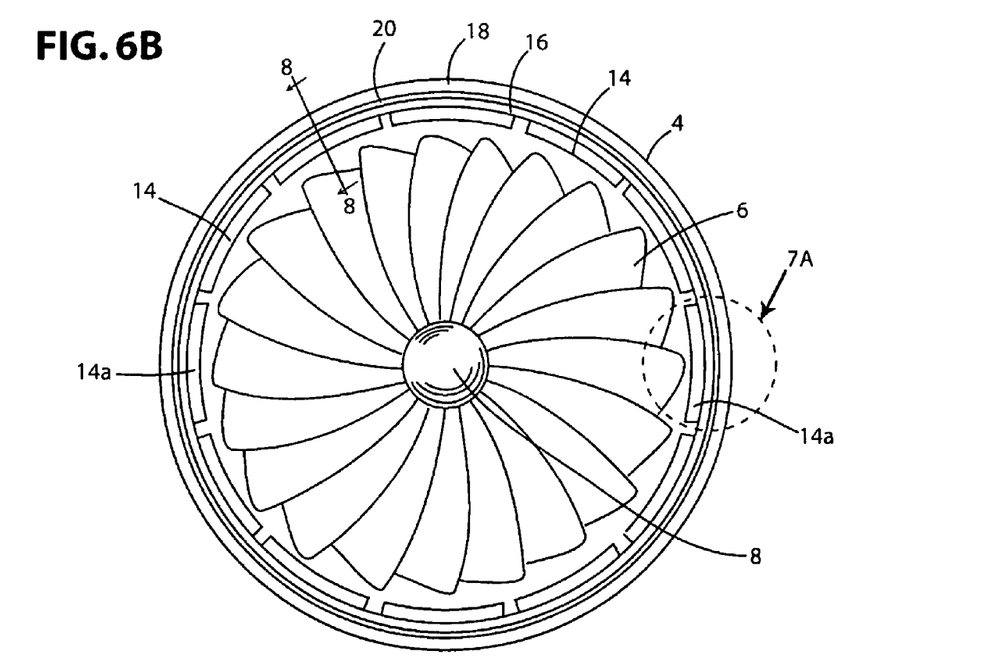
FIG. 6b provides another view of the jet engine illustrated in FIG. 6a that has been further adapted according to principles of the present invention.

Referring next to FIG. 6b, there is shown an exemplary portion of another fan containment case 4 according to principles of the present invention. As illustrated in FIG. 6a, the fan case 4 once again includes three generally concentric layers 14, 16 and 18 that effectively and efficiently reinforce the fan case 4 to accommodate loads resulting from blade-out events. However, in contrast to the fan case 4 of FIG. 6a, the load spreader layer 14 is not formed as a continuous ring, but rather as a series of distinct, circumferentially-arrayed load spreader segments 14a. Typically, the load spreader layer 14 may include between 2 and 14 distinct segments. In the example illustrated by FIG. 6b, twelve segments 14a define the load spreader layer 14.

Figure 5:
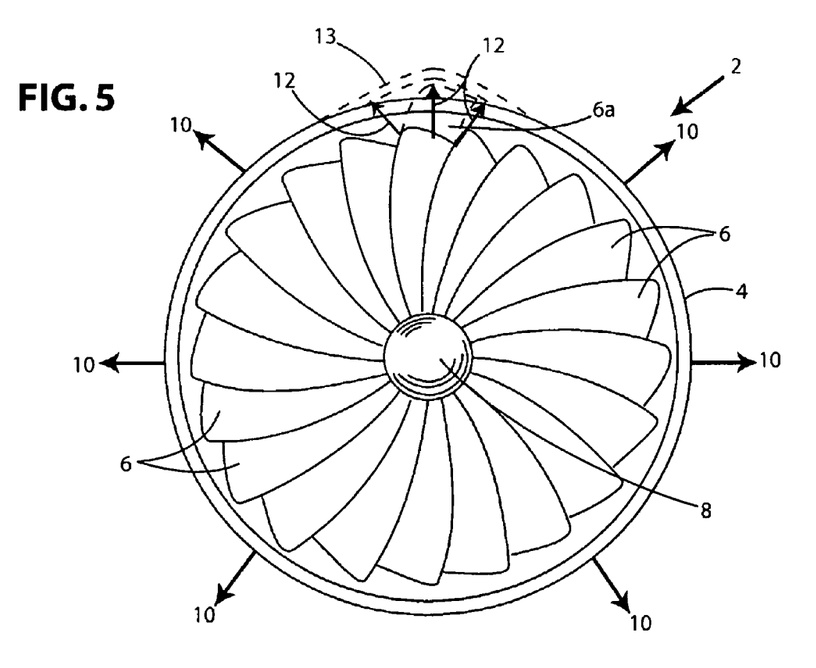
FIG. 5 provides another front view of the jet engine illustrated in FIG. 2.

The segmentation of load spreader layer 14 into load spreader segments 14a prevents the accumulation of hoop tensile loads in the load spreader layer 14, because generated loads are contained within the individual segment or segments 14a that are directly impacted by the liberated blade 6a of FIG. 5, rather than being transferred around the inner perimeter of the case 4 (as would be the case for load spreader layer 14 of FIG. 6a). By preventing the transfer and accumulation of hoop tensile loads in the segmented layer 14, the load spreader segments 14a may for example be produced from a less ductile material than materials typically selected to produce the load spreader layer 14 of FIG. 6a.

Figure 7A:
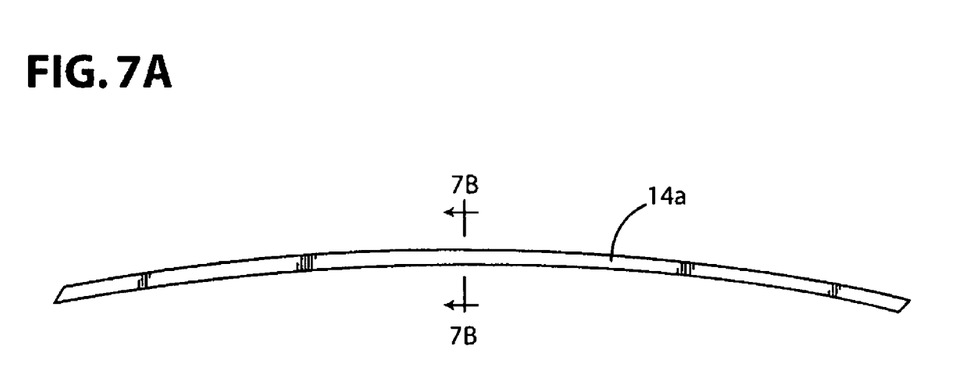
FIG. 7a provides an enlarged view of a segment of a containment layer as illustrated in FIG. 6.

FIG. 7a presents an enlarged front view of a single segment 14a from the load spreader layer 14, as a cut-away section of FIG. 6b. As earlier described in reference to the load spreader layer 14 of FIG. 6a, spreader segments 14a may be produced from a variety of conventional non-reinforced polymers, ceramics or metals, among other materials. The load spreader segments 14a as illustrated in FIGS. 6b and 7a have an arcuate length of approximately 30 degrees, and may be configured with ends that are canted (for example, at an angle ranging between 30 and 50 degrees).

The inventors of the present invention have found that canting the ends of the individual segments helps to reduce the probability that a liberated blade 6a as illustrated in FIG. 5 directly reaches the second layer 16 by striking a point between and at the ends of load spreader segments 14a, as well as the probability that the liberated blade 6a striking a load spreader segment 14a at an end of the segment 14a will dislodge it. Consistent with the principles of the present invention, the ends of segments 14a may be canted at any angle greater than 0 degrees and less than 90 degrees, and more preferably, at angles ranging from 30 to 50 degrees.

Figure 9A:
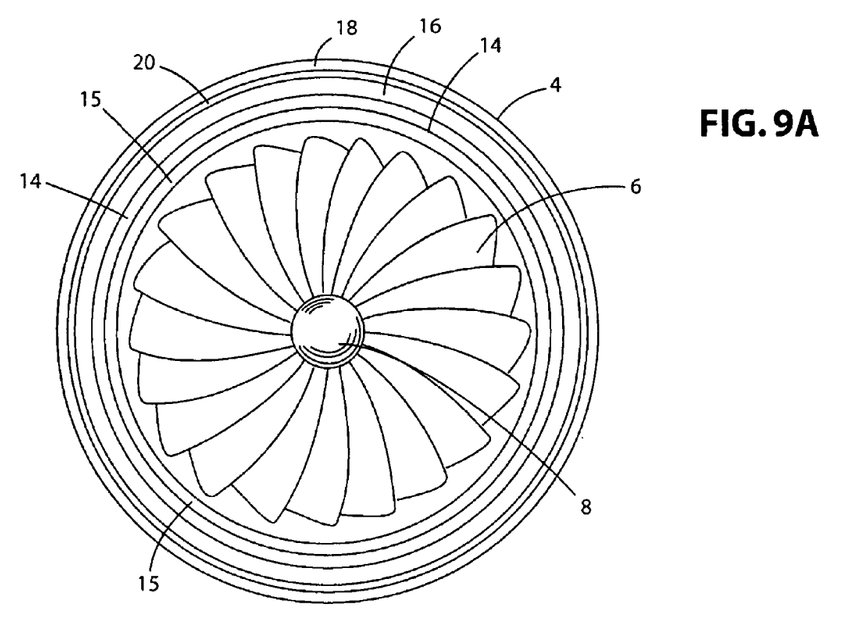
FIG. 9a provides a front view of the jet engine illustrated in FIG. 2 that has been adapted according to principles of the present invention.

Referring now to FIG. 9a, there is shown another exemplary portion of a fan containment case 4 according to principles of the present invention. In FIG. 9a, two load spreader layers 14, 15 are applied to the fan case 4. As a result, the fan case 4 of FIG. 9a includes five generally concentric layers (14, 15, 16, 20 and 18) that reinforce the fan case 4 to accommodate loads resulting from blade-out events. Alternatively, one or more of these layers may be omitted (for example, layers 20 and 18), or additional layers may be added (for example, a third load spreader layer applied on the interior circumference of load spreader layer 15), according to particular cost, weight and performance requirements for the fan case 4.

Figure 9B:
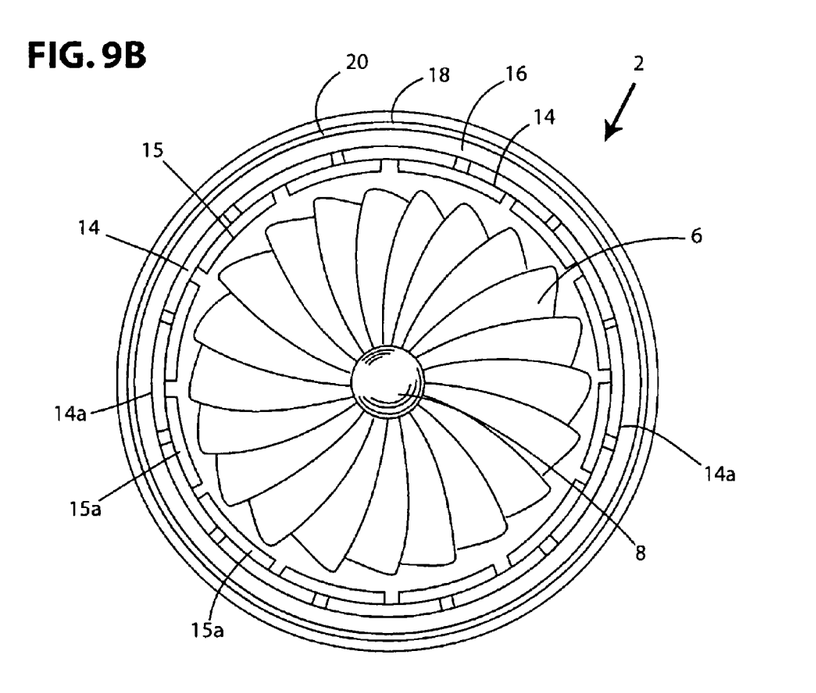
FIG. 9b provides another view of the jet engine illustrated in FIG. 9a that has been further adapted according to principles of the present invention.

Referring now to FIG. 9b, one more example is shown providing an exemplary portion of a fan case 4 according to principles of the present invention. In the fan case 4 of FIG. 9b, load spreader layers 14, 15 are respectively provided as circumferentially-arrayed load spreader segments 14a, 15a. Load spreader layers 14, 15 are arranged so that ends of the load spreader segments 14a in load spreader layer 14 overlap load spreader segments 15a in load spreader layer 15. This arrangement limits the probability that a liberated blade will pass through both load spreader layers 14, 15 to strike second layer 16.

As shown in FIG. 9b, the segments 15a of the inner layer 15 are positioned such that the ends of the segments 15a lie at points along the arcuate lengths of the segments 14a. As a result, spaces between the underlying segments 14a are effectively obstructed by overlying segments 15a, and spaces between the overlying segments 15a are effectively backed by the underlying segments 14a. In this manner, the liberated blade 6a must strike at least one of a load spreader segment 15a or 14a along its arcuate length, thereby distributing the point load to the struck load spreader segment before it reaches the second layer 16.

In the configuration illustrated by FIG. 9b, segments 15a are symmetrically positioned with respect to segments 14a, such that spaces between the segments 15a are essentially located at the center of the arcuate lengths of the segments 14a. In alternative embodiments, the ends of segments 15a may be selected to be located at any point along the arcuate length of segments 14a, as long as the selected locations cause the spaces between the segments 14a to be obstructed by segments 15a.

Figure 7B:
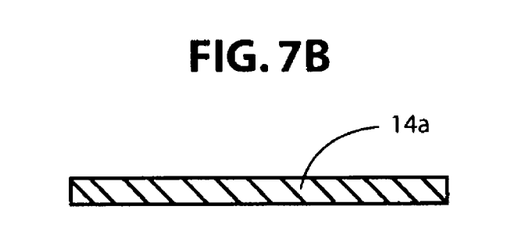

FIG. 7b presents a side sectional view of a segment 14a along the axial length of the jet engine; as shown along line 7b-7b in FIG. 7a. As previously noted, segments 14a can be produced from a variety of materials including conventional fiber reinforced or non-reinforced polymers, ceramics or metals (for example, steel or other suitable metals), as permitted according to cost and weight requirements.

In the configuration shown in FIGS. 9a and 9b, layers 14 and 15 may be constructed of the same or of different materials. For example, layer 15, which is closer to the blades 6 than layer 14, may be constructed using a relatively stiff material, such as steel or ceramic. A softer material may then be selected for layer 14, such as a polymer or polycarbonate.

In the configuration illustrated by FIG. 9b, the spacing in between adjacent load spreaders 14a, 15a in layers 14, 15 can be as small, for example, as 0.015 inches, and may vary within each of the layers 14, 15, and between the layers 14, 15. The number, design, and dimensions of the load spreader segments 14a within layer 14 and/or segments 15a within layer 15, as well as the materials used to produce the load spreader segments 14a, 15a, will vary according to product specifications providing performance, weight and cost requirements.

As previously noted, the second layer 16 as illustrated in FIGS. 6a, 6b, 8, 9 and 9b can be constructed from a variety of materials (for example, including a conventional FRP material) to form the base of the fan case 4. Alternatively, the second layer 16 may be constructed from a braided FRP or other similar material. The specifications for layer 16 will vary according to particular performance, weight and cost requirements, and therefore do not limit the scope of the present invention.

Figure 8:
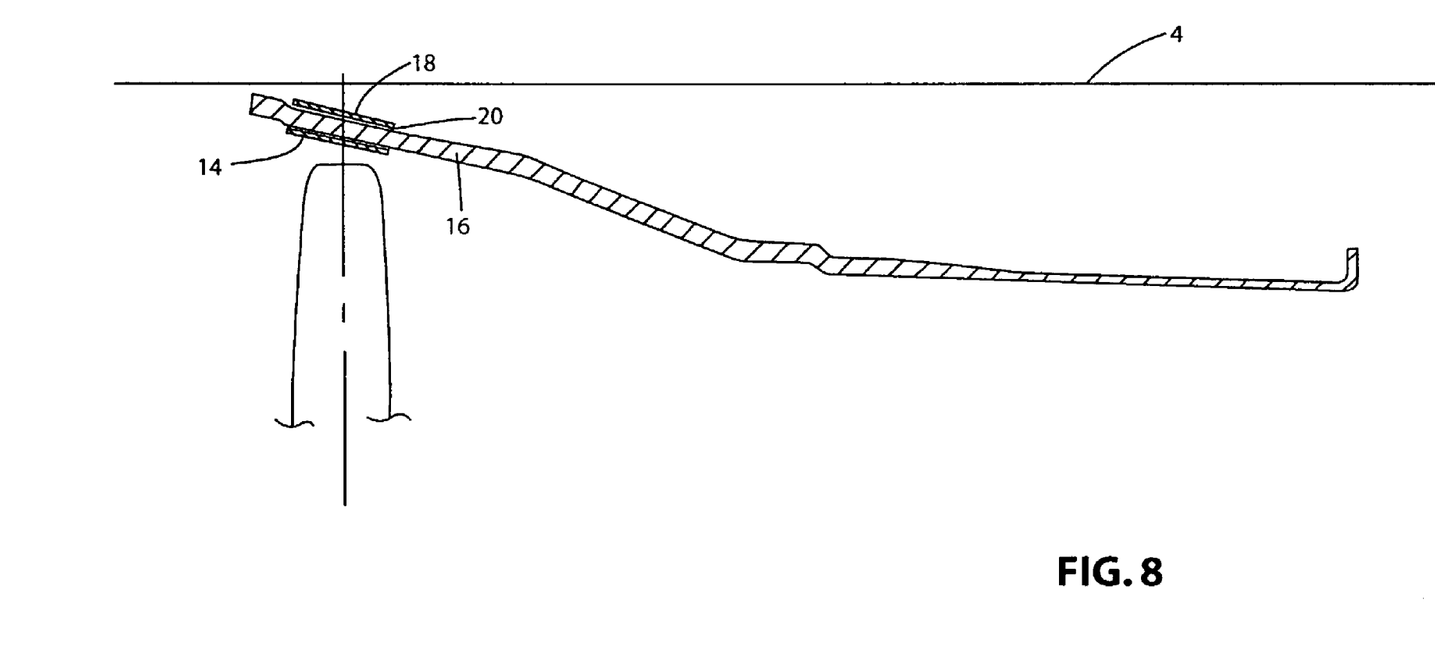
FIG. 8 shows a sectional view of the jet engine of FIG. 6 along a longitudinal axis of the jet engine.

FIG. 8 shows a side sectional view of the fan containment case 4 along the longitudinal axis of the jet engine 2 (and along lines 8-8 shown in FIG. 6b). Layers 14 and 16 are applied to the fan case 4 in proximity to an air intake end of the jet engine 2, and are oriented to frame a blade containing region around the blades 6 in order to coincide with the area of the fan case 4 where point and tensile hoop loads are generated during a blade-out event.

As shown in FIG. 8, a third layer 18 is applied to the fan case 4 in proximity to the blade containing region. As previously noted, third layer 18 can be produced from a variety of materials (including, for example, conventional FRP material) in order to help to carry the hoop tensile loads that accumulates during a blade-out event. The inventors have determined that the principal failure mode of the fan case 4 during a blade-out event is a tensile failure resulting as the released blade 6a is slowed by the fan case 4. The orientation of the associated tensile load in the fan case 4 is primarily in the radial direction, as shown in FIG. 5 by arrows 12. The tensile load resulting from the blade-out event also causes a substantial hoop stress to be circumferentially generated in the fan case 4.

The specifications for layer 18 will vary in accordance with the specifications for the fan case 4, as dictated for example by particular performance, weight and cost requirements, and therefore do not limit the scope of the present invention.

FIGS. 6a, 6b, 8, 9a and 9b also show a separator film layer 20 that is applied in between layer 16 and layer 18. As previously noted, separator film layer 20 may comprise a fluoropolymer such as PTFE, and act to discourage the formation of stress concentrations in the third layer 18 at an impact location. As in the case of layers 16 and 18, specifications for separator film layer 20 will vary in accordance with the specifications of the fan case 4, as dictated for example by particular performance, weight and cost requirements, and therefore do not limit the scope of the present invention.

It should be noted that many variations in the number of load spreader layers 14, 15, band layers 18 and separator film layers 20 applied to the blade containing region of fan case 4 are possible, will be determined by performance, cost and weight requirements, and are all fully contemplated within the scope of the present invention. For example, in addition to applying two or more load spreader layers 14, 15 to the second layer 16, two or more band layers 18 may be applied to the second layer 16, with or without a separator film layer 20. The number, configurations and specifications of layers for the inventive fan case 4 design therefore do not limit the scope of this invention.

Numerous details have been set forth in this description, which is to be taken as a whole, to provide a more thorough understanding of the invention. In other instances, well-known features have not been described in detail, so as to not obscure unnecessarily the invention.

The invention includes all combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be later presented in this or a related application.

What is claimed is:

1. A fan blade containment assembly for a gas turbine engine, comprising:
   a fan case having an inner surface for surrounding a fan mounted for rotation about an engine axis and an outer surface, the fan case in addition having a circumferentially and axially extending blade containing region; and
   a first load spreader layer attached in contacting engagement with the fan case inner surface and located within the blade containing region; wherein in response to a blade-out event, the first load spreader layer mitigates cutting and gouging of the inner surface of the fan case by a fan blade released during the blade-out event, and acts as a point load spreader to distribute a point load to the fan case that is generated on the first load spreader layer by the released blade, and
   a first band layer mounted to the fan case outer surface in proximity to the blade containing region, wherein the first band layer is capable of carrying at least a portion of a hoop tensile load on the fan case that results from the blade-out event.

2. The fan blade containment assembly according to claim 1, wherein the first load spreader layer includes a plurality of load spreader segments circumferentially arrayed within the blade containing region and positioned to define a plurality of gaps between ends of adjacent ones of the plurality of load spreader segments, wherein each load spreader segment is capable of acting as a point load spreader to isolate and uniformly distribute a point load to the fan case that is generated on the first load spreader segment as the result of a blade-out event.

3. The fan blade containment assembly according to claim 2, wherein each of the plurality of first load spreader segments has an arcuate length ranging between 1/14 and 1/10 of the circumference of the first load spreader layer.

4. The fan blade containment assembly according to claim 2, wherein the ends of each load spreader segment are canted at an angle greater than 0 degrees and less than 90 degrees.

5. The fan blade containment assembly according to claim 4, wherein the ends of each load spreader segment are canted at an angle ranging between 30 degrees and 50 degrees.

6. The fan blade containment assembly according to claim 1, wherein the fan case comprises a material selected from the group consisting of fiber-reinforced polymers and metals, wherein the fiber-reinforced polymers comprise one or more of carbon braid, cloth fiber or triaxial braid, and wherein the triaxial braid includes one or more of carbon fibers, quartz fibers, glass fibers or aramid fibers.

7. The fan blade containment assembly according to claim 1, wherein the first load spreader layer comprises a material selected from the group consisting of fiber-reinforced polymers, non-reinforced polymers, ceramics and metals.

8. The fan blade containment assembly according to claim 1, wherein the first band layer comprises a material selected from the group consisting of fiber-reinforced polymers, cloth fiber, wound fiber, biaxial braid and triaxial braid, wherein the biaxial braid and the triaxial braid each include one or more of carbon fibers, quartz fibers, glass fibers or aramid fibers.

9. The fan blade containment assembly according to claim 1, wherein the blade containing region of the fan case has a circular cross-section.

10. The fan blade containment assembly according to claim 1, further comprising:
    at least a second band layer mounted to an outer surface of the first band layer and extending across the blade containing region.

11. A fan blade containment assembly for a gas turbine engine comprising:
    a fan case having an inner surface for surrounding a fan mounted for rotation about an engine axis and an outer surface, the fan case in addition having a circumferentially and axially extending blade containing region; and
    a first load spreader layer attached to the fan case inner surface and located within the blade containing region; wherein in response to a blade-out event, the first load spreader layer mitigates cutting and gouging of the inner surface of the fan case by a fan blade released during the blade-out event, and acts as a point load spreader to distribute a point load to the fan case that is generated on the first load spreader layer by the released blade,
    a first band layer mounted to the fan case outer surface in proximity to the blade containing region, wherein the first band layer is capable of carrying at least a portion of a hoop tensile load on the fan case that results from the blade-out event, further comprising
    a separator film layer mounted between the fan case outer surface and the first band layer, wherein the separator film layer is capable of retarding the formation of stress concentrations in the first band layer as a result of the blade-out event.

12. A fan blade containment assembly for a gas turbine engine comprising:
    a fan case having an inner surface for surrounding a fan mounted for rotation about an engine axis and an outer surface, the fan case in addition having a circumferentially and axially extending blade containing region; and
    a first load spreader layer attached to the fan case inner surface and located within the blade containing region; wherein in response to a blade-out event, the first load spreader layer mitigates cutting and gouging of the inner surface of the fan case by a fan blade released during the blade-out event, and acts as a point load spreader to distribute a point load to the fan case that is generated on the first load spreader layer by the released blade, further comprising
    a second load spreader layer mounted to an inner surface of the first load spreader layer and located within the blade containing region.

13. The fan blade containment assembly according to claim 12, wherein the first load spreader layer includes a plurality of load spreader segments circumferentially arrayed within the blade containing region and positioned to define a plurality of gaps between ends of adjacent ones of the plurality of load spreader segments, wherein each load spreader segment is capable of acting as a point load spreader to isolate and uniformly distribute a point load to the fan case that is generated on the first load spreader segment as the result of a blade-out event, further comprising:
    the second load spreader layer including a plurality of second load spreader segments circumferentially arrayed within the blade containing region and positioned to define a plurality of gaps between ends of adjacent ones of the plurality of second load spreader segments.

14. The fan blade containment assembly according to claim 13, wherein each of the first load spreader segments and the second load spreader elements has an arcuate length, and the second load spreader segments are positioned so that the gaps defined between ends of adjacent ones of the second load spreader segments fall along the arcuate lengths of the first load spreader segments.

15. The fan blade containment assembly according to claim 13, further comprising:
   at least a third load spreader layer mounted to an inner surface of the second load spreader layer and located within the blade containing region; the third load spreader layer including a plurality of third load spreader segments circumferentially arrayed within the blade containing region and positioned to define a plurality of gaps between ends of adjacent ones of the plurality of third load spreader segments.

16. The fan blade containment assembly according to claim 13, wherein the first load spreader segments comprise a material selected from the group consisting of polymers and polycarbonates, and the second load spreader segments comprise a material selected from the group consisting of steels and ceramics.

17. The fan blade containment assembly according to claim 12, wherein the first load spreader layer comprises a material selected from the group consisting of polymers and polycarbonates, and the second load spreader layer comprises a material selected from the group consisting of steels and ceramics.

18. A fan blade containment assembly for a gas turbine engine comprising:
   a fan case having an inner surface for surrounding a fan mounted for rotation about an engine axis and an outer surface, the fan case in addition having a circumferentially and axially extending blade containing region; and
   a first load spreader layer attached to the fan case inner surface and located within the blade containing region; wherein in response to a blade-out event, the first load spreader layer mitigates cutting and gouging of the inner surface of the fan case by a fan blade released during the blade-out event, and acts as a point load spreader to distribute a point load to the fan case that is generated on the first load spreader layer by the released blade,
   a first band layer mounted to the fan case outer surface in proximity to the blade containing region, wherein the first band layer is capable of carrying at least a portion of a hoop tensile load on the fan case that results from the blade-out event,
   at least a second band layer mounted to an outer surface of the first band layer and extending across the blade containing region, further comprising
   a separator film layer mounted between the first band layer and the at least second band layer.

19. A fan blade containment assembly for a gas turbine engine, comprising:
   a fan case having an inner surface for surrounding a fan mounted for rotation about an engine axis and an outer surface, the fan case in addition having a circumferentially and axially extending blade containing region;
   at least one load spreader layer attached to the fan case inner surface and located within the blade containing region;
   at least one band layer mounted to the fan case outer surface in proximity to the blade containing region, and
   a separator film layer mounted between the fan case outer surface and the at least one band layer,
   wherein in response to a blade-out event, the at least one load spreader layer mitigates cutting and gouging of the inner surface of the fan case by a fan blade released during the blade-out event and acts as a point load spreader to distribute a point load to the fan case that is generated on the first load spreader layer by the released blade, wherein the at least one band layer is capable of carrying at least a portion of a hoop tensile load that is generated in the fan case from the blade-out event, and wherein the separator film layer is capable of retarding the formation of stress concentrations in the first band layer as a result carrying the portion of the hoop tensile load.

20. The fan blade containment assembly according to claim 19, wherein the at least one load spreader layer includes a plurality of load spreader segments circumferentially arrayed within the blade containing region and positioned to define a plurality of gaps between ends of adjacent ones of the plurality of load spreader segments, wherein each load spreader segment is capable of acting as a point load spreader to isolate and uniformly distribute a point load to the fan case that is generated on the first load spreader segment as the result of a blade-out event.

* * * * *